United States Patent [19]
Takamizawa et al.

[11] 3,855,259
[45] Dec. 17, 1974

[54] METHOD OF PREPARING PHENYLCHLOROSILANES

[75] Inventors: Minoru Takamizawa; Mitsuo Umemura, both of Annaka, Japan

[73] Assignee: Shinetsu Chemical Company

[22] Filed: Feb. 21, 1973

[21] Appl. No.: 334,277

[30] Foreign Application Priority Data
Feb. 23, 1972 Japan................................ 47-18665

[52] U.S. Cl. .......................... 260/448.2 T, 252/474
[51] Int. Cl. ............................................... C07f 7/16
[58] Field of Search ............... 260/448.2 T; 252/474

[56] References Cited
UNITED STATES PATENTS

| | | | |
|---|---|---|---|
| 2,380,995 | 8/1945 | Rochow ................... | 260/448.2 T X |
| 2,380,996 | 8/1945 | Rochow et al. .......... | 260/448.2 T X |
| 2,464,033 | 3/1949 | Gilliam ..................... | 260/448.2 T |
| 2,666,775 | 1/1954 | Nitzsche ................... | 260/448.2 T |
| 2,903,473 | 9/1959 | Takami et al. ............ | 260/448.2 T |

*Primary Examiner*—Daniel E. Wyman
*Assistant Examiner*—Paul F. Shaver
*Attorney, Agent, or Firm*—McGlew and Tuttle

[57] ABSTRACT

Phenylchlorosilanes are produced by contact reaction of chlorobenzene with a mass composed of metallic silicon and a catalyst comprising copper as a main component and an iron oxide in an amount of from 0.5 to 5%, preferably 1 to 2%, by weight based on the weight of the mass, the reaction taking place at a temperature of from 400° to 500°C. This method remarkably improves the yield of the products and helps reduce the amount of the expensive cupreous catalysts used therein.

9 Claims, No Drawings

METHOD OF PREPARING PHENYLCHLOROSILANES

BACKGROUND AND SUMMARY OF THE INVENTION

This invention relates to an improved method of preparing phenylchlorosilanes. Phenylchlorosilanes are used as starting materials in the manufacture of silicone oils, silicone varnishes, and silicone rubber; these phenylchlorosilanes have been prepared by a method wherein chlorobenzene is subjected to contact reaction with a mass of metallic silicon and a cupreous catalyst, the method being called the Direct Method. In another method of preparation benzene or chlorobenzene is subjected to dehydrogenation or dehydrochlorination with a chlorosilane compound containing $HSi\equiv$ bonds at an elevated temperature under high pressure.

In the Direct Method, the cupreous catalysts which are used, contain copper in a high ratio to the metallic silicon, say, Cu:Si = 3:7 to 4:6. Thus are expensive and consequently cause an increase in the production costs; what is worse, even if a promoter such as zinc or tin is used in addition, the reaction rate will still be low, and the phenylsilane formation reaction will hardly be reproduced. Further, in the aforementioned other method, it is difficult to secure the necessary materials with ease at low prices and in large amounts for the production of phenylchlorosilanes like diphenyldichlorosilanes and triphenylchlorosilanes, although this method may be advantageous over the Direct Method to some extent in the production of phenyltrichlorosilanes and phenylmethyldichlorosilanes. As such, these conventional methods are not suited to commercial operations.

SUMMARY AND OBJECTS OF THE INVENTION

It is an object of the present invention to provide a method of preparing phenylchlorosilanes, free from the disadvantages given above.

The method according to the invention comprises contact-reacting chlorobenzene with a mass composed of metallic silicon and a catalyst comprising copper as a main component and an iron oxide in an amount of from 0.5 to 5% by weight based on the weight of the mass at a temperature between 400°C and 500°C.

DESCRIPTION OF THE INVENTION

Hithertofore, in the production of halosilanes by the Direct Method, it has been the practice to add one or more promoters selected from the group consisting of Zn, Sn, Ag, Cd, Pb, Mg, and Sb to the above-mentioned metallic silicon-cupreous mass. In our own effort to develop and improve a method of preparing phenylchlorosilane, we have succeeded in the discovery that the addition of an iron oxide to the silicon-cupreous mass results in remarkable improvements in the contact reaction and yield, and also in the remarkable reduction of the amount of the expensive cupreous catalyst used in proportion to the metallic silicon.

The copper content in the catalyst as a main component according to the invention need not be metallic copper but may be in the form of a copper compound, for example, cupric chloride, which will produce metallic copper by being heated.

Included among the iron oxides employed in the method of the invention are FeO, $Fe_2O_3$, and $Fe_3O_4$, of which $Fe_3O_4$ is particularly recommended as suiting the objects of the invention. The iron oxide, as used, need not be in the form of oxide, but it may be one that can turn into an oxide when heated, for example, iron oxalate.

If the amount of the iron oxide used in the invention, if it is too small, the objects of the invention will not be attained, while if the amount of iron oxide is too large, the decomposition of the material component, chlorobenzene, will be accelerated, resulting in the reduction of reaction rate; therefore the iron oxide must be in the range of from 0.5 to 5 percent, preferably from 1 to 2 percent, by weight based on the weight of the silicon-cupreous contact mass.

The silicon-cupreous mass used in the invention may be any conventional one, for example, a mass comprising metallic silicon and metallic copper, so long as it contains the above-described iron oxide, and in addition, if necessary, one or more promoters selected from the group consisting of Zn, Sn, Ag, Cd, Pb, Mg, and Sb.

The method of the invention is effectively practiced at a temperature in the range of from 400° to 500°C. If the temperature is lower than 400°C, the reaction rate will be remarkably reduced, while if it is higher than 500°C, the thermal decomposition reaction would occur to affect formation of phenylchlorosilane and result in the reduction in the rates of production as well as yield.

In practicing the method of the invention, chlorobenzene is passed through the powdery contact mass while being stirred. If necessary, an inert gas, such as nitrogen, may be used in addition to the chlorobenzene, and this helps lead the product (effective phenylchlorosilanes) out of the system having temperatures at which they would be decomposed.

The following examples illustrate but do not limit the generality of what is elsewhere herein stated. In the examples, parts are all parts by weight, and the components of each liquid obtained are determined by gas chromatography.

EXAMPLE 1

Into an iron reaction column of 50 mm diameter and 500 mm long, equipped with a forced stirrer, were put 500 g of a mixture mass consisting of 78 parts of metallic silicon powder (purity: 99 percent), 20 parts of copper powder, 1 part of zinc powder and 1 part of ferrosoferric oxide ($Fe_3O_4$). Through the powdery mixture while being stirred nitrogen was passed at 350°C for 4 hours for drying. Then the temperature was raised to 450°C, and chlorobenzene was sent through the dried mass at the rate of 45 g/hr for 24 hours, to produce 969 g of a liquid, the components of which are given below. The production rate of effective phenylchlorosilane in this case was 261 g/kg.Cu/hr.

| | |
|---|---|
| $SiCl_4$ | 0.9% |
| $C_6H_6$ | 11.0% |
| $C_6H_5Cl$ | 15.0% |
| $C_6H_5SiCl_3$ | 25.1% |
| $(C_6H_5)_2$ | 3.2% |
| $(C_6H_5)_2SiCl_2$ | 39.6% |
| $(C_6H_5)_3SiCl$ and substances having high boiling points | 5.2% |

Control 1

A procedure similar to that of Example 1 was repeated with the exception that the mixture mass consisted of 79 parts of metallic silicon powder (purity: 98 percent), 20 parts of copper powder, and 1 part of zinc powder. The product obtained was 1,243 g of a liquid, the components of which are given below. The production rate of effective phenylchlorosilane in this case was 93 g/kg.Cu/hr.

| | |
|---|---|
| $SiCl_4$ | 0.1% |
| $C_6H_6$ | 3.4% |
| $C_6H_5Cl$ | 67.8% |
| $C_6H_5SiCl_3$ | 8.6% |
| $(C_6H_5)_2$ | 1.9% |
| $(C_6H_5)_2SiCl_2$ | 9.4% |
| $(C_6H_5)_3SiCl$ and substances having high boiling points | 8.8% |

Control 2

A procedure similar to that of Example 1 was repeated with the exception that the mixture mass consisted of 59 parts of metallic silicon powder (purity: 98 percent), 40 parts of copper powder, and 1 part of zinc powder. The product obtained was 1,094 g of a liquid, the components of which are given below. The production rate of the effective phenylchlorosilane in this case was 125 g/kg.Cu/hr.

| | |
|---|---|
| $SiCl_4$ | 0.2% |
| $C_6H_6$ | 6.8% |
| $C_6H_5Cl$ | 31.1% |
| $C_6H_5SiCl_3$ | 17.8% |
| $(C_6H_5)_2$ | 2.8% |
| $(C_6H_5)_2SiCl_2$ | 37.2% |
| $(C_6H_5)_3SiCl$ and substances having high boiling points | 4.1% |

EXAMPLE 2

A procedure similar to that of Example 1 was repeated with the exception that ferric oxide ($Fe_2O_3$) was used instead of ferrosoferric oxide. The product obtained was 1,191 g of a liquid, the components of which are given below. The production rate of the effective phenylchlorosilane in this case was 202 g/kg.Cu/hr.

| | |
|---|---|
| $SiCl_4$ | 0.4% |
| $C_6H_6$ | 6.8% |
| $C_6H_5Cl$ | 40.8% |
| $C_6H_5SiCl_3$ | 18.4% |
| $(C_6H_5)_2$ | 3.5% |
| $(C_6H_5)_2SiCl_2$ | 22.4% |
| $(C_6H_5)_3SiCl$ and substances having high boiling points | 7.7% |

EXAMPLE 3

A procedure similar to that of Example 1 was repeated with the exception that the mixture mass consisted of 78.5 parts of metallic silicon powder (purity: 98 percent), 20 parts of copper powder, 1 part of zinc powder and 0.5 part of ferrosoferric oxide. The product obtained was 1,206 g of a liquid, the components of which was given below. The production rate of the effective phenylchlorosilane in this case was 153 g/kg.Cu/hr.

| | |
|---|---|
| $SiCl_4$ | 0.2% |
| $C_6H_6$ | 4.6% |
| $C_6H_5Cl$ | 56.3% |
| $C_6H_5SiCl_3$ | 12.1% |
| $(C_6H_5)_2$ | 2.5% |
| $(C_6H_5)_2SiCl_2$ | 18.3% |
| $(C_6H_5)_3SiCl$ and substances having high boiling points | 6.0% |

EXAMPLE 4

A procedure similar to that of Example 1 was repeated with the exception that the mixture mass consisted of 77 parts of metallic silicon powder (purity: 98 percent), 20 parts of copper powder, 1 part of zinc powder and 2 parts of ferrosoferric oxide, and that the chlorobenzene was sent at a rate of 50 g/hr. The product obtained was 1,318 g of a liquid, the components of which are given below. The production rate of the effective phenylchlorosilane in this case was 258 g/kg.Cu/hr.

| | |
|---|---|
| $SiCl_4$ | 1.0% |
| $C_6H_6$ | 9.4% |
| $C_6H_5Cl$ | 32.9% |
| $C_6H_5SiCl_3$ | 22.0% |
| $(C_6H_5)_2$ | 4.3% |
| $(C_6H_5)_2SiCl_2$ | 24.9% |
| $(C_6H_5)_3SiCl$ and substances having high boiling points | 5.5% |

EXAMPLE 5

A procedure similar to that of Example 1 was repeated with the exception that the mixture mass consisted of 83 parts of metallic silicon powder (purity: 98 percent), 5 parts of Cu—Zn alloy powder (Cu:Zn = 80:20), and 2 parts of ferrosoferric oxide. The product obtained was 1,182 g of a liquid, the components of which are given below. The production rate of the effective phenylchlorosilane in this case was 186 g/kg.Cu/hr.

| | |
|---|---|
| $SiCl_4$ | 0.2% |
| $C_6H_6$ | 3.6% |
| $C_6H_5Cl$ | 62.0% |
| $C_6H_5SiCl_3$ | 7.4% |
| $(C_6H_5)_2$ | 0.7% |
| $(C_6H_5)_2SiCl_2$ | 20.9% |
| $(C_6H_5)_3SiCl$ and substances having high boiling points | 5.2% |

EXAMPLE 6

Into an iron reaction column similar to the one employed in Example 1 were put 500 g of a mixture mass consisting of 75 parts of metallic silicon powder (purity: 98 percent), 20 parts of copper powder, 1 part of zinc powder, and 4 parts of iron oxalate. The mixture mass was kept in a stream of nitrogen at 350°C for 8 hours, to have the iron oxalate decomposed. Then the temperature was raised to 450°C and chlorobenzene was passed through the mass at the rate of 50 g/hr for 24 hours. The product obtained was 1,141 g of a liquid, the components of which are given below. The production rate of the effective phenylchlorosilane in this case was 276 g/kg.Cu/hr.

| | |
|---|---|
| $SiCl_4$ | 0.8% |
| $C_6H_6$ | 10.8% |
| $C_6H_5Cl$ | 25.3% |
| $C_6H_5SiCl_3$ | 22.3% |
| $(C_6H_5)_2$ | 3.7% |
| $(C_6H_5)_2SiCl_2$ | 35.7% |
| $(C_6H_5)_3SiCl$ and substances having high boiling points | 1.5% |

EXAMPLE 7

Procedure similar to that Example 6 was repeated with the exception that the mixture mass consisted of 70 parts of metallic silicon powder (purity: 98 percent), 29 parts of copper powder, and 1 part of ferrosoferric oxide, and that chlorobenzene was passed at the rate of 45 g/hr. The product obtained was 1,106 g of a liquid, the components of which are given below. The production rate of the effective phenylchlorosilane in this case was 162 g/kg.Cu/hr.

| | |
|---|---|
| $SiCl_4$ | 0.1% |
| $C_6H_6$ | 5.6% |
| $C_6H_5Cl$ | 35.5% |
| $C_6H_5SiCl_3$ | 22.2% |
| $(C_6H_5)_2$ | 2.8% |
| $(C_6H_5)_2SiCl_2$ | 28.6% |
| $(C_6H_5)_3SiCl$ and substances having high boiling points | 5.2% |

Control 3

A procedure similar to that of Example 7 was repeated with the exception that the mixture mass consisted of 70 parts of metallic silicon powder (purity: 98 percent), and 30 parts of copper powder. The product obtained was 1,260 g of a liquid, the components of which are given below. The production rate of the effective phenylchlorosilane in this case was 75 g/kg.Cu/hr.

| | |
|---|---|
| $SiCl_4$ | 0.2% |
| $C_6H_6$ | 6.2% |
| $C_6H_5Cl$ | 63.5% |
| $C_6H_5SiCl_3$ | 11.6% |
| $(C_6H_5)_2$ | 2.0% |
| $(C_6H_5)_2SiCl_2$ | 9.8% |
| $(C_6H_5)_3SiCl$ | 6.7% |

What is claimed is:

1. Method of preparing phenylchlorosilanes which comprises contact-reacting chlorobenzene with a mass composed of metallic silicon and a catalyst comprising a major portion of copper and a minor portion of an iron oxide in an amount of from about 0.5 percent to about 5 percent by weight based on the weight of said mass at a temperature in the range of from about 400° to about 500°C.

2. The method as claimed in claim 1 wherein said iron oxide consists essentially of ferrosoferric oxide.

3. The method as claimed in claim 1, wherein said iron oxide is present in an amount of from about 1 to about 2 percent by weight based on the weight of said mass.

4. The method as claimed in claim 1, wherein said catalyst is composed of zinc in addition to said copper and iron oxide.

5. The method as claimed in claim 1, wherein said iron oxide is $Fe_2O_3$.

6. The method as claimed in claim 1, wherein said iron oxide is FeO.

7. The method as claimed in claim 1, wherein said iron oxide is formed in situ from a thermally decomposable iron salt.

8. The method according to claim 7, wherein the salt is iron oxalate.

9. The method according to claim 1, wherein said catalyst contains at least one member selected from the group consisting of Zn, Sn, Ag, Cd, Pb, Mg and Sb.

* * * * *